United States Patent
Ram et al.

(10) Patent No.: US 7,260,069 B2
(45) Date of Patent: Aug. 21, 2007

(54) SYSTEM AND METHOD FOR SATELLITE BASED CONTROLLED ALOHA

(75) Inventors: Uzi Ram, Petah Tikva (IL); Refi Heiman, Petah Tikva (IL); Tzvi Meiri, Petah Tikva (IL)

(73) Assignee: Gilat Satellite Networks, Inc., McLean, VA (US)

( * ) Notice: Subject to any disclaimer, the term of this patent is extended or adjusted under 35 U.S.C. 154(b) by 1158 days.

(21) Appl. No.: 09/880,793

(22) Filed: Jun. 15, 2001

(65) Prior Publication Data

US 2002/0034165 A1 Mar. 21, 2002

Related U.S. Application Data

(60) Provisional application No. 60/225,307, filed on Aug. 15, 2000, provisional application No. 60/211,475, filed on Jun. 15, 2000.

(51) Int. Cl.
*H04B 7/212* (2006.01)
(52) U.S. Cl. ........................................ 370/322; 370/444
(58) Field of Classification Search ................ 370/322, 370/345, 347, 442, 443, 444, 445, 447, 458, 370/461, 462
See application file for complete search history.

(56) References Cited

U.S. PATENT DOCUMENTS

| | | | |
|---|---|---|---|
| 5,012,469 A | 4/1991 | Sardana | |
| 5,053,782 A | 10/1991 | Levinberg et al. | |
| 5,084,900 A | 1/1992 | Taylor | |
| 5,138,631 A | 8/1992 | Taylor | |
| 5,796,726 A | 8/1998 | Hassan et al. | |
| 5,818,828 A | 10/1998 | Packer et al. | |
| 6,747,959 B1 * | 6/2004 | Ho | 370/282 |
| 6,845,085 B1 * | 1/2005 | Wright et al. | 370/324 |
| 6,847,626 B1 * | 1/2005 | Carneal et al. | 370/345 |
| 6,859,464 B2 * | 2/2005 | Abi-Nassif et al. | 370/447 |
| 2001/0019542 A1 * | 9/2001 | Diachina et al. | 370/329 |
| 2004/0072570 A1 * | 4/2004 | Smith | 455/446 |
| 2005/0053033 A1 * | 3/2005 | Kelly et al. | 370/329 |
| 2005/0149649 A1 * | 7/2005 | Carneal et al. | 710/36 |

FOREIGN PATENT DOCUMENTS

EP  0 996 242 A  4/2000

* cited by examiner

*Primary Examiner*—Seema S. Rao
*Assistant Examiner*—Kevin Mew
(74) *Attorney, Agent, or Firm*—Banner & Witcoff, Ltd.

(57) ABSTRACT

A system and method for satellite based controlled ALOHA is provided. The system and method configure VSATs so that they accept guidance from a centralized and/or distributed system controller to determine when, where, and/or on what portion of a satellite resource to attempt to access a channel. The system and method take advantage of traffic patterns to maximize efficiency by utilizing a centralized and/or distributed control to determine which VSATs are and are not currently active, and to allocate to a portion of the inbound channel to the active VSATs and a portion of the inbound channel to the inactive VSATs. In a distributed approach, each VSAT decides for itself whether it captures a certain part of the inbound resource or not. This decision can be made based on previous transmissions that went through the part of the inbound intended to be captured.

18 Claims, 2 Drawing Sheets

FIG. 1

As a background we assume familiarity of the slotted ALOHA ("RA") model, $S=G*P\_success$, where $P\_success=\exp(-G)$.

Notation
S1   Throughput generated by VSATs with Controlled RA (CRA) allocation
G1   Load generated by VSATs with CRA allocation
S2   Throughput generated by VSATs who don't have CRA allocation
G2   Load generated by VSATs who don't have CRA allocation Relation / Explanation
$S1 = G1 * \exp(-G2)$  Transmissions of VSATs with CRA collide with G2 only.
$S2 = G2 * (1-G1) * \exp(-G2)$  Non-CRA VSAT transmissions collide with both. G1 loads the inbound in a single burst per time/freq-slot manner. G2 loads the inbound as in ALOHA-a few bursts may show up in a single time/freq-slot.

More notations:
P       Fraction of traffic that is sent by VSATs with CRA allocation
S       Total throughput
P_scs   Prob of success in Slotted ALOHA
P_scs_1 Prob of success for those VSATs with CRA allocation
P_scs_2 Prob of success for those VSATs with no CRA allocation More Relations
$S1 = S * p$
$S2 = S - S1 = S * (1-p)$
$P\_scs = \exp(-G)$ where G satisfies $S = G * P\_scs$
$P\_scs\_1 = \exp(-G2)$. $P\_scs\_2 = (1-G1) * \exp(-G2)$.
        where G1 and G2 satisfy $S1 = G1 * P\_scs\_1$, and $S2 = G2 * P\_scs\_2$
$S2/S1 = G2/G1 * P\_scs\_2/P\_scs\_1 = G2/G1 * (1-G1)$
        therefore $G2 = S2/S1 * G1/(1-G1)$ Here is a spreadsheet that calculates these formulas for p=80%.

| | For RA | | For CRA with proportion of CRA traffic, p= 80.0% | | | | | | Verification through calculating | | | |
| S | G | P_scs | S1 | S2 | G1 | G2 | P_scs_1 | P_scs_2 | delta-S1 | delta-S2 | delta-S | Avg P_scs |
|---|---|---|---|---|---|---|---|---|---|---|---|---|
| 10.0% | 11.2% | 89.4% | 8.0% | 2.0% | 8.2% | 2.2% | 97.8% | 89.8% | 3.281E-05 | 8.2E-06 | -2.3E-07 | 96.2% |
| 15.0% | 17.9% | 83.6% | 12.0% | 3.0% | 12.4% | 3.5% | 96.5% | 84.6% | 0.0004916 | 0.000123 | 4.73E-05 | 94.1% |
| 20.0% | 25.9% | 77.2% | 16.0% | 4.0% | 16.8% | 5.1% | 95.1% | 79.1% | 6.722E-05 | 1.68E-05 | 3.29E-06 | 91.9% |
| 25.0% | 35.7% | 70.0% | 20.0% | 5.0% | 21.4% | 6.8% | 93.4% | 73.5% | 0.0003088 | 7.72E-05 | 9.95E-06 | 89.4% |
| 30.0% | 48.9% | 61.3% | 24.0% | 6.0% | 26.1% | 8.8% | 91.5% | 67.6% | 0.000915 | 0.000229 | 9.58E-06 | 86.8% |
| 35.0% | 71.7% | 48.8% | 28.0% | 7.0% | 31.4% | 11.4% | 89.2% | 61.2% | 4.496E-05 | 1.12E-05 | 2.4E-06 | 83.6% |
| 40.0% | | | 32.0% | 8.0% | 37.0% | 14.7% | 86.3% | 54.4% | 0.0004309 | 0.000108 | | 79.9% |
| 45.0% | | | 36.0% | 9.0% | 43.7% | 19.4% | 82.4% | 46.4% | 0.000133 | 3.33E-05 | | 75.2% |
| 48.7% | | | 39.0% | 9.7% | 49.8% | 24.8% | 78.0% | 39.2% | 0.0009785 | 0.000245 | | 70.3% |
| 50.0% | | | 40.0% | 10.0% | 53.0% | 28.2% | 75.4% | 35.5% | 0.0002245 | 5.61E-05 | | 67.4% |

FIG. 2

SYSTEM AND METHOD FOR SATELLITE BASED CONTROLLED ALOHA

The present application claims priority from provisional application 60/211,475 filed Jun. 15, 2000 and provisional application 60/225,307 filed Aug. 15, 2000, the contents of which is incorporated herein by reference.

BACKGROUND OF THE INVENTION

1. Technical Field

The present invention relates to the field of satellite multi-access control mechanisms and, more particularly, to apparatuses and techniques for controlling random access to satellite communication networks.

2. Description of Related Art

Various types of multiple access schemes are known to allow multiple users to utilize satellite communication system resources.

A substantial improvement to the basic ALOHA system is described in U.S. Pat. No. 5,053,782('782 patent) having a common assignee as the present application. Other variants of the ALOHA scheme include U.S. Pat. No. 5,084,900 ('900 Patent) and U.S. Pat. No. 5,138,631 ('631 patent) to Spacenet, a subsidiary of the present assignee.

Coordinating the data transfer from the hub to the VSATs (outbound) is relatively simple because the hub is a unique source of information. However, coordinating the data transfer from the VSATs to the hub (inbound) is significantly more complex particularly where there are thousands, tens of thousands, or even hundreds of thousands of terminals vying to access the same satellite resources in a non-synchronized manner. There is a need for a satellite network to connect a very large numbers of very small aperture terminals (VSATs) and one or more central stations (hubs) via a two directional communication satellite link. Current schemes are limited in their performance. In particular, the maximal utilization under a given response time constraint is limited. Thus, there is a need for a system and method for a multiple access scheme which allows a very large number of remote stations with infrequent bursts of data to communicate over a shared VSAT channel in a more efficient way than currently known multiple access schemes provide. Further, the system needs to be inexpensive so that it may deployed in a mass market bringing the benefits of VSAT technology to the average consumer.

SUMMARY OF THE INVENTION

Aspects of the present invention solve one or more of the above-stated problems and/or provide improved systems and methods for implementing a satellite network architecture.

Aspects of the present invention include configuring VSATs to accept guidance from a centralized and/or distributed system controller to determine when, where, and/or on what portion of a satellite resource to attempt to "capture" a channel. This may be a specific instruction, but preferably includes a range of appropriate time, frequency, and/or other resources which the remote VSATs may be configured to randomly choose responsive to guidance from a control system. Aspects of the present invention have been termed "controlled ALOHA" to indicate that the ALOHA scheme is controlled to gain the efficiency advantages of the dedicated channels for more active connections along with the efficiency advantages of a pure ALOHA system for the truly random accesses by a large body of substantially non-active terminals.

In further aspects of the present invention, a recommendation may be made to a subset of the total VSAT terminals, typically a subset of active VSAT terminals, to try to capture (e.g., when and/or where) a particular portion of a medium resource in which to transmit. In this manner, a single channel may have dual channel characteristics in that it may both act as a "dedicated" and random access manner at the same time. Certain properties of real traffic patterns cause the present invention to provide improved performance, such as throughput/delay characteristics, over known variations of the ALOHA technique. The present system is particularly advantageous in satellite systems where there are long delays between the VSAT terminals and a central location such as one or more Hubs, delays that prohibit carrier sense techniques to improve ALOHA. Thus, controlled random access (CRA) provides a network dedicated access like functionality, but without allocating a resource to a VSAT in a dedicated, collision free manner.

Aspects of the present invention are particularly useful in, for example, direct-to-home VSAT systems (or other similarly situated systems) where traffic pattern are such that only a small fraction of the VSATs are actually using the inbound link at any given time interval (e.g., a time-interval of one or two minutes). For example, in a direct-to-home system, only a small fraction of the overall customers (e.g., internet users) may be transmitting data at any one given time interval. Thus, during any given time-interval, most of the inbound traffic is generated by a very small percentage of the overall number of VSATs in the system. The set of active VSATs slowly varies over time (some of the active VSATs become inactive while other inactive VSATs become active). In any event, given a large enough population of VSATs, the number of active VSATs, remains relatively small but varies over time.

The present invention takes advantage of this traffic pattern to maximize efficiency by utilizing a centralized (e.g. in the hub) and/or distributed control to determine which VSATs are and are not currently active, and to allocate to a portion of the inbound channel to the active VSATs and a portion of the inbound channel to the inactive VSATs. This allocation may be variously configured.

In one aspect of the invention, the currently active VSATs may not randomize their transmissions over the entire inbound capacity. Rather, each of the active VSATs may be assigned a portion of the inbound capacity. Thus, the active VSAT may transmit on a predetermined portion of the inbound capacity (rather than randomly) whenever the VSAT has inbound data to transmit (such as a data frame of information). In this manner, each of the active VSATS may be assigned a predetermined inbound resource and may not collide with other active VSATS. Aspects of the invention include allocating some and/or all of the inbound channel capacity to active VSATs. In these aspects of the invention, the inactive VSATs may be configured to randomize their transmissions, if they have any, over the whole inbound capacity. In these aspects of the invention, the active VSATs may not collide between themselves, but collisions may occur between transmissions of active VSATs and currently inactive VSATs, and between transmissions of inactive VSATs and themselves.

Aspects of the invention discussed above allow the satellite channel to be much more efficient in that the number of collisions is substantially reduced over other satellite communication schemes. The only collisions that are permitted to occur involve inactive VSATS rather than the currently active VSATS. Thus, the overall efficiency of the satellite communication channel is substantially improved, particularly for satellite network configurations with long delays and many terminals.

Thus, the present invention provides the use of the same channel simultaneously in a random access mode (e.g., ALOHA) and in a dedicated mode (e.g., reservation allocation). Thus, in networks according to the present invention, while one VSAT is using the Inbound resource in a reserved-like mode, some (e.g., non-active) and/or all other VSATs are allowed to use the Inbound resource at the same time in a random manner. In this fashion, the system and method of the present invention contrasts sharply with known reservation-like schemes where a single VSAT is allowed to use the allocated resource, and all other VSATs are informed (explicitly or implicitly) of that, and therefore don't interfere with the single VSAT transmissions.

Controlled random access reduces the average collision probability in the Inbound. For a given Inbound capacity, the delay characteristics may also be substantially improved. Aspects of the present invention reduce inbound capacity requirements for a given delay (i.e., a given collision probability). In other words, the present invention improves the throughput-delay characteristics of the conventional ALOHA channel, particularly for use with a large number of VSAT terminals having burst data characteristics of a medium to long characteristic. Controlled random access may be used with one and/or two dimensional ALOHA systems.

In further aspects of the invention, controlled random access avoids explicit requests of reserved capacity by the VSATs. This reduces traffic as well as eliminates the need to pause the VSAT data transfer from the time the VSAT requests for reservation until the time the VSAT receives the resource allocation. The VSAT does not have to estimate or predict the amount of data the VSAT expects to carry or to obtain reserved resources for, as is the case for reservation requests associated with a specified data amount ("transaction reservation"). Likewise, aspects of the invention do not require the VSAT to send a message to release the resource, as is the case for reservations and allocations that do not indicate data amount to be transferred ("stream reservation" or "circuit switch"). Thus, overall performance is substantially improved.

Thus, there is described aspects of the invention in which implementation variants simultaneously utilize allocated capacity and random access capacity of an Inbound channel.

The Controlled ALOHA scheme of the present invention can be implemented in several ways, central, distributive, or a combination of these two. According to a centralized approach, a central algorithm is as described below. In this approach, aspects of the invention utilize a central entity, such as the hub, to gather VSATs traffic statistics, identify active VSATs, and allocate inbound resources among the VSATs.

In alternative aspects of the invention, a distributed approach is utilized. According to a distributed approach, there may be little or no involvement of a central entity. Instead, each VSAT decides for itself whether it captures a certain part of the inbound resource or not. This decision can be made based on previous transmissions that went through the part of the inbound intended to be captured. If a previous transmission (or previous transmissions) in this part of the inbound resource was successful (i.e., a collision did not occur), the VSAT may decide to control this inbound part, and its sequel transmissions may be using this particular part of the inbound resource. If transmissions in this part collide, the VSAT decides not to control it. The distributed approach is advantageous in that performance of the control mechanisms is enhanced since there is no need for a centralized location to coordinate each of the VSATs. Rather, each VSATs capture parts of the shared capacity in a distributive manner independently of every other VSAT.

In still further aspects of the invention, each VSAT decides for itself whether it should get a controlled random access channel, request it, and the hub allocates the channel to the requesting VSAT. The VSAT may make the decision based on statistical analysis or the level of its cache.

Thus, these and other aspects of the invention may become apparent by reference to the Figures and Detailed Description of the preferred embodiments described below. Numerous inventions and alternative aspects of the inventions are described throughout the specification. These inventions may be claimed at any time in the future and the ability to modify the combinations and sub combinations claimed are not intended to be limited by the currently appended claims. The described invention includes one or more elements from the apparatus and methods described herein in any combination or sub combination. Accordingly, there are any number of alternative combinations for defining the invention, which incorporate one or more elements from the specification in any combinations or sub combinations. Other ways to implement one or more aspects of the present invention may be apparent to those skilled in the art and include combinations of the approaches described above.

BRIEF DESCRIPTION OF THE FIGURES

FIG. 2 shows an analysis of the CRA theoretical performance improvements.

DETAILED DESCRIPTION

Figure 1:
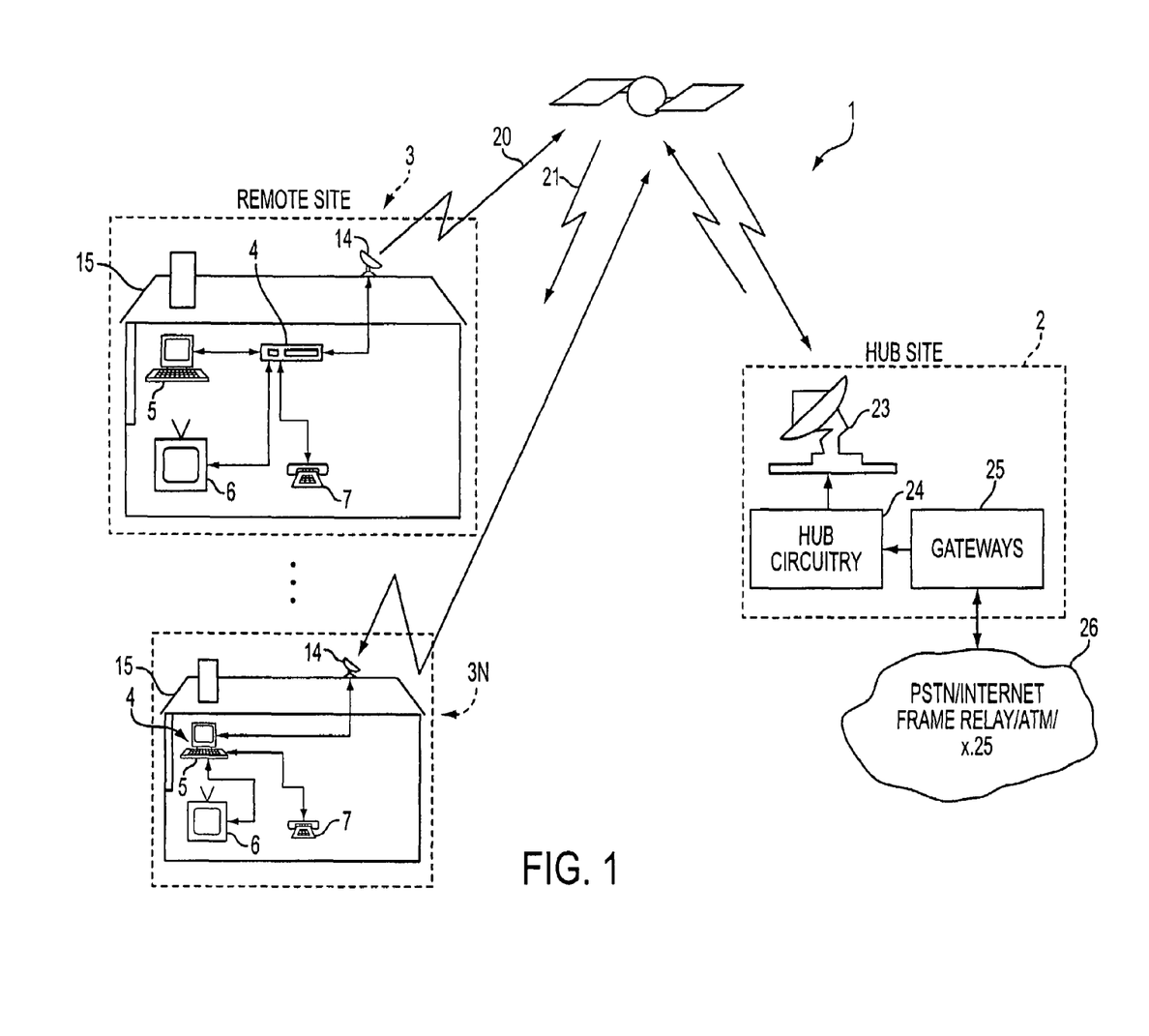
FIG. 1 shows a typical satellite communication environment showing a large number of diverse two-way residential VSAT systems vying for the same satellite resources in accordance with the present invention.

Referring to FIG. 1, a satellite communication system 1 is shown having a hub site 2 and a plurality of remote sites 3-3N. In preferred embodiments, the remote sites 3 reside at a residence 15 and include a small VSAT antenna 14, a satellite transceiver 4 and a plurality of periphery devices such as computer 5, television 6, and telephone 7. The residence preferably includes a home, but may be variously configured to include a business, office, or other location. In some embodiments, the transceiver 4 may be configured as an adapter card in a personal computer such as is shown in remote site 3N. In exemplary systems, hundreds of thousands or even millions of residences 15 may be interconnected using one or more satellite networks 3. The receiver may provide decoding for internet and/or other two-way data for a personal computer, one or two-way cable television signals, and telephony data. The telephony data may be IP telephony or a simulated conventional plain old telephony (POTS) interface.

The communication paths to the satellite may be one or more low speed uplink channels (inbound) 20 and one or more high speed down-link channels (outbound) 21. The inbound and outbound channels preferably originate from one or more hub sites 2. The hub site 2 may include one or more antennas 23, hub circuitry 24 such as one or more satellite modems, processing computers, storage, cache servers, and/or other processing resources. The hub circuitry may interface to a plurality of external networks 26 such as the public switched telephony network (PSTN), Internet, frame relay networks, ATM networks, and/or X.25 networks. For example, the gateways 25 may include a cable TV gateway providing, for example, a frame relay connection for coupling cable television signals from a remote content site to and/or from the HUB site using a frame relay network. The gateways 25 may also include a PSTN gateway for coupling the one or more telephones 7 in one or more remote sites 3 to the public switched telephone network (PSTN) by providing appropriate connections to one or more SS7 signaling systems and associated switched connections. Similarly, the computers 5 at the remote sites may be coupled to the Internet and/or directly to a remote business network using, for example, IP tunneling and/or a direct ATM connection by providing an Internet and/or ATM gateway at the hub site 2.

In this manner, the remote site 3 has complete connectivity while bypassing the telephone company and local cable operator. Thus, a remote site has total freedom to operate unconnected from the local suppliers and associated price structures and system constraints. In this manner, the satellite network 3 may provide the end user with 500 or more interactive television channels, high speed internet service, unlimited number of telephone numbers and other services at a lower cost than conventional suppliers.

In order to enable the satellite network to operate cost effectively, a new access system and method is needed. In exemplary embodiments, the receiver 4 may begin in an inactive inbound state. In this state, it may have no need to access the inbound channel 20 but may receive data, such as television programming, from the outbound channel 21. When the user desires to access the inbound channel 20 such as by requesting Internet data, making a phone call, and/or accessing a two-way television feature, the receiver 4 tries to capture an inbound resource from the inbound channel 20. This may be done by contending for one or more of the inbound resources and transmitting inbound data to the hub site. If a collision occurs, the transmission may occur again at random/pseudo random times and/or using random/pseudo random inbound resources until such time as the remote site 3 is successful in capturing an inbound resource.

Where the transceiver monitors its internal cache and/or other criteria to help determine that there is a high likelihood that the site is initiating a moderate to long transmission (e.g., where the remote site has initiated a telephone call, web access, and/or a file transfer), the remote site may itself request allocation of a assigned inbound resource. Alternatively, once the remote site has been active for a predetermined period of time and/or sufficiently active during any one sliding window, the hub site may respond and/or directly allocate an inbound resource to the remote site. Once the inbound resource has been allocated to one remote site 3, the currently active remote site may no longer randomize its inbound transmissions over the entire inbound capacity. Rather, the active remote site 3 may now assigned a portion of the inbound capacity and thus transmits on a predetermined portion of the inbound capacity (rather than randomly) whenever the remote site has inbound data to transmit. In a similar fashion, each other remote site which becomes active is assigned a similar, but different, portion of the inbound resources. In this manner, each of the active remote sites may not collide with other active remote sites. When a site is no longer active, e.g., when the file transfer has completed, the site and/or hub releases the resource previously assigned to the active site for reallocation.

The inactive remote sites may be configured to randomize their transmissions, if they have any, over the whole inbound capacity (including the inbound capacity assigned to active sites). Thus, the active remote sites 3 are configured so that they do not collide with each other, but may collide on occasion with inactive remote sites 3. Additionally, inactive remote sites may themselves collide with each other.

Embodiments of the present invention typically are not implemented on a demand assignment basis where a channel is demanded and assigned to a particular remote site 3 on a semi-permanent basis. Demand access systems are very cumbersome and not well suited to data which has short length and burst characteristics. However, in certain situations, it may be desirable to utilize the controlled random access mode (active sites), random access mode (for inactive sites), and demand assignment (fixed channel capacity) for certain constant on sites which may be provided out-of-band such that each mode may coexist on a single system.

Packets transmitted on a channel in accordance with embodiments of the satellite network 1 described herein may not be free of collisions. In some embodiments, other remote sites (for which a channel has not been allocated) can still transmit on the same inbound resource such as frequency and/or timeslot. The active remote sites 3 may still collide with the inactive remote sites 3 and the inactive remote sites 3 may still collide with each other. The controlled random access scheme implemented by the present satellite network 1 may be most appropriate for networks where, at any given time, most of the traffic is created by a small number of active remote sites, but may still have burst traffic of short duration from a very large number of remote sites.

The satellite network 1 can be implemented in a centralized manner with the hub site 2 determining both the threshold criteria for determining an active site and the allocation of resources. In this approach, embodiments of the invention utilize a central entity, such as the hub site 2, to gather traffic statistics from the various remote sites 3, identify active remote sites 3 from the traffic statistics, and allocate inbound resources among the active remote sites 3 and then inform every other remote site 3 of the allocation.

Alternatively, the satellite network 1 may be implemented in a distributive manner with the remote site determining when it has passed a threshold of becoming an active site, vie for and capture an inbound resource, and inform every other remote site that the inbound resource has been captured. This embodiment of the invention may be utilized where every remote site receives the same satellite signals bounced off of the satellite as the hub site 2, or where the hub or switching satellite informs the allocation. Thus, in some embodiments the remote sites 3 may act in a completely distributed manner without input from the hub site 2. In embodiments utilizing this approach, there may be little or no involvement of a central entity. Instead, each VSAT decides for itself whether it captures a certain part of the inbound resource or not. This decision can be made based on previous transmissions that went through the part of the inbound resource intended to be captured. If a previous transmission (or previous transmissions) in this part of the inbound resource was successful (i.e., a collision did not occur), the remote site may decide to control this inbound part, and its sequel transmissions may be using this particular part of the inbound resource. If transmissions in this part collide, the remote site decides not to control it. The distributed approach is advantageous in that performance of the control mechanisms is enhanced since there is no need for a centralized location to coordinate each of the remote sites.

In still further embodiments of the invention, each remote site monitors the nature and type of transmission and notifies the hub site that it has become active and is likely to have a medium to long transmission. The hub site 2 may then take over and allocate a portion of the inbound resources to the newly active remote site 3. Thus, the control for the satellite network 1 may be divided between the remote sites and the hub sites with each doing that portion of the control task which it is optimized to control. Hence, each remote site decides for itself whether it should capture a controlled random access channel (become active), request the channel, and the hub allocates the channel to the requesting remote site. In this manner, if the remote site has only a very small amount of data, such as an acknowledgement or a couple of bytes to transmit, it knows immediately that it does not need semi-exclusive use of a resource and hence does not request one from the hub site 2.

One preferred embodiment of the satellite network 1 in accordance with the present invention is discussed below in some detail. This embodiment is exemplary in that other embodiments and variations in accordance with the present teachings may be apparent to those skilled in the art.

The controlled random access satellite network 1 may be configured to prevent much of the inbound packets' collisions by allocating a fixed resource such as frequency and/or time slot for the remote sites 3 in the network which generates the most inbound traffic. In this manner, it is possible to prevent packets generated by the most active remote sites 3 from colliding with each other, thus preventing most of the collision in the network. Statistically, it is often the case that more then 80% of the network traffic at any given time is generated by a small number of remote sites. The number of the remotes sites is actually so small that one can allocate a fixed frequency, time slot, and/or other resource for every such active remote site, thus eliminating all the collisions between packets from these remote sites. Where 80% of the network load is among the active sites, many if not most collisions may be avoided, and the network throughput is likely to increase dramatically.

Where there is an unusual burst of traffic (e.g., mothers day or a major disaster where the phone is utilized extensively), there may be situations where there are more active remote sites 3 than resources. If the there are more active remote sites than inbound resources, each remote site may be allocated only a "mini-slot" (e.g., a portion of the inbound resource). For example, each remote site 3 may be allocated a time slot every third frame and/or a frequency intermittently. Thus, each active remote site 3 may be allocated only part of an inbound resource.

Where channel overload is approaching, the system may allocate inbound slots to voice traffic first, followed by data traffic. In this manner, voice calls may not be lost and data transmissions may simply be delayed.

Example Definitions

In this example, the following terms maybe utilized:

CRA channel—a frequency, used for random access (CRA) transmission, on which remote sites 3 may transmit packets when using the controlled random access scheme Multi-slot—a number of time-slots, as used by the partial demand assignment mechanism.

Mini-slot—one time-slot in a multi-slot cycle, i.e. one time-slot every multi-slot time-slots.

CRA slot—a mini-slot in a controlled random access channel. This may be the basic allocation unit and may be a time slot within a certain uplink frequency.

CRA allocation—The process of allocating controlled random access channels to a remote site.

active remote site—a remote site to which at least one controlled random access slot was allocated.

Inactive remote site—a remote site in which no CRA slot was allocated.

CRA allocation table—a mapping between available CRA slots in the system and the remote sites to which they have been allocated.

Load (of a remote site)—a numeric value, which may indicate the amount of inbound traffic the remote site generates.

Exemplary CRA Implementation

In order to implement the CRA access scheme in the hub site 2 (and/or the remote sites in a distributed scheme), it may be desirable to perform one or more of the following activities:

Load calculation—the hub site 2 may calculate the load of every remote site and may retain this value in memory in any suitable table such as a data structure. In exemplary embodiments, the data structure may be defined as the data structure. The load of every remote site may also be correlated with the last time slot in which a burst was last received from this remote site.

Announcing CRA allocation changes to remote sites—the hub site 2 may announce the changes in the CRA allocation table in the AA message of the last mini-slot in the multi-slot (when the load calculation may be carried out).

Keeping remote sites consistent with the hub site 2 CRA allocation tables may be updated in every inbound frame (sent by the remote site) and may include the remote site link state such as random access, assigned inbound resource, CRA frequency and other parameters) to inform the hub site 2 of the remote site state as the remote site knows it. The hub site 2 may notify every remote site in every frame whether it is in CRA mode by including a 1-bit CRA on/off indicator for one or more remote sites.

CRA Channels

In exemplary embodiments, the hub site 2 may need to know the number and frequencies of all CRA channels the remote sites can transmit on. For example, a first group of remote sites may be able to transmit on a first group of frequencies, a second group of remote sites on a second group of frequencies, a third group of remote sites on a third group of frequencies, and so forth. Where the hub site requires this information, it may be stored in one or more configuration files and/or in the data structure. The channels may be defined in accordance with the receivers capabilities and their number can vary in accordance with the number of currently active channels and the capabilities of the remote site. The number of channels a group of remote sites requires depends heavily on the system unique traffic characteristics.

In exemplary embodiments, the hub allocates and otherwise manages a pool of controlled random access frequencies/sub channels. The CRA channels configuration may include such items as the type and/or quantity of CRA channels, the number of CRA channels which maybe allocated to a particular site, the inbound and/or outbound frequencies a remote site is configured to receive. For each active site, the allocation of an inbound resource may include the same allocation process. For example, a CRA slot (on a certain CRA channel) may be allocated to a remote site if and only if the remote site belongs to the same inbound band. The central site may or may not check to determine whether the receiver can receive certain allocated frequencies. In some embodiments, it may be desirable to have the receiver receive the correct frequencies for any particular remote site. The remote site may have one and/or a plurality of bit rates. Where the remote site is capable of multiple bit rates, the hub site 2 may allocate a plurality of inbound resources to the remote site, depending on overall system load.

For some sites, it may be desirable to define certain predefined parameters. For example, certain sites may only have two way cable television and thus have carefully defined traffic parameters. In these sites, short bursty traffic will be most common if not the exclusive transmission mechanism. Thus, the satellite network 1 may be configured such that these sites may never become active sites. Other sites may only have telephone connections, and thus every active site is likely to be an active site once a connection is initiated. Further, it is possible to tailor the inbound resources to the requirements of a particular site. For example, a small business may pay additional money to have a committed information rate for its inbound link. In this situation, the designated remote site maybe allocated X number of mini-slots and/or channels each time that it becomes active.

Certain other parameters may also be defined such as a hysteresis whereby a site may remain an active site for X number of time slots and/or other measures such as windows and/or time after it is no-longer active (e.g., falls below the definition of an active site). In this manner, where the user stops to look at a web page or pauses speaking in a phone call, the active site status of the remote site is not lost. This hysteresis may be variable depending on the type of traffic. For example, the hysteresis may be defined as falling within 8 or fewer frames. The hysteresis parameter may be used to avoid rapid mode changes of remote sites. In still further exemplary embodiments, a remote site may be allocated a CRA channel if and only if its load value is larger than the minimum load value of all active remote sites plus a hysteresis value.

Additional set-up parameters may also be provided such as a loading factor for certain remote sites. For example, the remote site actual traffic may be multiplied by a loading factor (e.g. 2, 4, or 8) such that the site becomes active more quickly than other remote sites. In this manner, certain remote sites may be provided with favorable treatment with respect to other remote sites. Other parameters which may be varied include the refresh interval after which the load of all the active remote sites may be re-calculated even if no packets were received from them. This defines the interval over which to determine whether to remove remote sites that are no longer active from the CRA allocation table. The number of mini slots within a multi-slot channel may also be controlled such that the number to allocate to a particular remote site maybe selected.

Synchronizing Multi-Slot Counters

In exemplary embodiments, certain remote sites may include a mechanism to receive mini-slot allocations. In one embodiment, a multi-slot counter may be utilized. The multi-slot counter may be implemented by synchronizing the counter with other remote sites and/or with the hub site 2. This maybe done through various mechanisms such as utilizing the link connect message generated by the remote sites and including a remote site multi-slot counter in the message. The hub site 2 may generate a response, including the remote site's multi-slot counter correction in the next frame. These two frames maybe consecutive, i.e. whenever a message is fragmented they may have to both be included in the one fragment.

If a remote site receives a query (e.g., an "open up" message), it may respond with a message (e.g., "connect" message) providing an indication of the contents of its multi-slot counter. However, as opposed to the above situation, the remote site might not receive the frame with the response. In such a case, the multi-slot counter of the remote site may not be synchronized with the hub site 2. Therefore, a remote site may check before every transmission that its multi-slot counter is synchronized, and if not it may synchronize it before sending any data.

Calculating Load

The load of the remote site may be calculated using any known technique consistent with the controlled random access system. In theory, it may be desirable to compute the load of the remote sites according to the following formula:

$$L_{new} = L_{old}(1-\tau)^n + \tau$$

Where TAU represents a configurable constant, n is the number of time-slots since the last time-slot on which a packet was received from this remote site and L-old is the previous load value of the remote site. In alternate calculations, the above load calculations may be performed using a normalizing constant M having a value such as 65,000 and using a time constant N, which is the number of time-slots in T seconds (where T is a configuration parameter). In these calculations, it may be desirable to define TAU as 1/N. Thus, the load calculations may be performed using the following formula:

$$L_{new} = L_{old} * M * (1 - 1/N)^n + M/N$$

Performance is always a concern when performing load calculations for a large number of remote sites. This is particularly useful in the present invention where load determinations are often required to be made very quickly. Accordingly, in embodiments of the present invention, the load computations may be made using a look-up table. The look-up table may store the values of $M*(1-1/N)^n$ for all valid n values (up to N), for example. In this manner, the load calculations are substantially improved.

New Data Structures

To implement the CRA channel allocation at the hub site 2 it is desirable to formulate new data structures. For example, it maybe desirable to include the number of frequencies that the receiver is capable of utilizing and the number of mini-slots the receiver may receive. Additionally, the data structure may include the total number and identification of free inbound resources such as channels and mini-slots. The data structure may also include the minimum and assigned maximum load value allocated to each remote site, the current inbound resources allocated to a particular remote site (e.g., one or more channels and/or mini-slots), whether the remote site may become an active site, and whether the remote site has any weighting factors associated with its load calculations.

The data structure may include in the same and/or a separate data structure a list of all remote sites from which a packet was received during the last measure increment such as a multi-slot time period, window, or other periodic measure. The data structure may also include their current load value after the most recent packet and/or other unit of data was received. If the current load value is larger than the minimal load of all the remote sites in the currently active allocation table, the site maybe moved to a active sites table. Conversely, if the load value is not sufficient, the remote site may remain in an inactive site table.

In exemplary embodiments, the inactive remote sites table may support the following operations: initialization, insert new remote site into data structure, returns minimal and/or maximum load for all remote sites in the inactive remote site data structure, removes and/or adds a specified remote site to the inactive remote site data structure.

To keep the required statistics and telemetry values, the data structures may also include: statistics and telemetry values, number or retry values for each inbound link, number of received bursts per time slot, the number of time-slots and/or burst data associated with the histogram, the last timeslot a packet was received from the remote site, the load of the remote site, the configuration of the remote site (television, data, telephony), the number of times an active remote site designation was allocated to this remote site (either absolute or per recent time period), the time of day associated with active status for a particular remote site, the minimal number of time slots during which an inbound resource was allocated to this remote site, the maximal number of time slots during which an inbound resource was allocated to this remote site, the total number of time slots during which a CRA channel was allocated to this remote site (used for the average calculation).

Exemplary Implementation Methods

The satellite systems 1 may include one or more methods of implementation. For example, the satellite system may include an initialization sequence, a response to packet arrival, a response to end of a multi-slot period, and a sequence to deal with a remote site going inactive, and a sequence which occurs periodically such as after every "refresh interval".

Initialization: Upon initialization, the CRA allocation table maybe initialized, the inactive remote site table may be initialized, and the L look-up table may be calculated.

Upon packet arrival: When the hub site 2 receives an inbound packet from a remote site, it may first calculate its new load value and update its value in the remote site's data structure. Then it may check to see if this remote site is a "active" remote site (i.e. if it already received a inbound resource allocation). If so, it may update its load value at the CRA allocation table. If not, it may check if its new load value is higher then the minimal load of all remote sites in the active site allocation table. If so, it may add it to the active remote sites table (if it wasn't in it already), or update its load in it (if it already was in it).

End of multi-slot: The hub site 2 may insert remote sites from the inactive remote sites table into the active site allocation table, as long as their load value is larger then the minimal load of all the remote sites in the active site allocation table. All the remote sites that were inserted/removed to/from the active site allocation table may be notified in the next message of their status change.

When a remote site goes active/inactive: When hub site 2 receives a link-connect message from a remote site, it may synchronize multi-slot counters as discussed above. Then it may nullify the remote site load value at its data structure. When a remote site goes off-line, it may be removed from the active site allocation table and/or the inactive remote sites table.

Every "refresh interval", the hub site 2 may re-calculate the load for all the remote sites in the active site allocation table, in order to decrease the load values of remote sites that haven't transmitted for a long time. This calculation may have to be synchronized with the above operations.

FIG. 2 shows an analysis of the CRA theoretical performance improvements. The mathematical model is described in FIG. 2 approximates the performance of the CRA system. The table at the bottom of FIG. 2 shows that for a given collision probability of 30% (this is 70% success probability) the well know ALOHA (or RA) provides 25% throughput while controlled RA is almost twice as efficient −48.7% throughput, hence requires in theory half the space segment (bandwidth) that's needed for RA.

Having described several embodiments of the system and method for satellite based controlled ALOHA in accordance with the present invention, it is believed that other modifications, variations and changes will be suggested to those skilled in the art in view of the description set forth above. It is therefore to be understood that all such variations, modifications and changes are believed to fall within the scope of the invention as defined in the appended claims.

What is claimed is:

1. A system for communicating with a large number of remote satellite locations comprising:
a plurality of a first set of remote terminal devices;
a plurality of second remote terminal devices operating in a dedicated mode using the same overlapping channels; and
a hub site which determines threshold criteria for determining when said remote terminal devices are active, and allocates said channels, wherein when said one of said plurality of second remote terminal devices has been sufficiently active during a sliding window, said one of said plurality of second remote terminal devices directly accesses said channels, wherein collisions between inbound packets from different ones of said first and second remote terminal devices are prevented by allocating one of frequency, time slot, and frequency and time slot to said ones of said first and second remote terminal devices that generate the most inbound traffic, wherein when there are more active ones of said first and second remote terminal devices than there are channels, each of said first and second remote terminal devices is allocated a mini-slot, wherein said hub site calculates load for each of said first and second remote terminal devices and retains loads in memory, and wherein said hub site correlates loads for each of said first and second remote terminal devices with the last time slot in which a burst was last received from each of said first and second remote terminal devices, and maintains said correlated loads in an allocation table.

2. A system for communicating with a large number of remote satellite locations as recited in claim 1, wherein said hub site transmits changes to said allocation table to said first and second remote terminal devices.

3. A system for communicating with a large number of remote satellite locations as recited in claim 1, wherein said hub site updates said allocation table every inbound frame.

4. A system for communicating with a large number of remote satellite locations comprising:
a plurality of a first set of remote terminal devices;

a plurality of second remote terminal devices operating in a dedicated mode using the same overlapping channels; and a hub site which determines threshold criteria for determining when said remote terminal devices are active, and allocates said channels, wherein when said one of said plurality of second remote terminal devices has been sufficiently active during a sliding window, said one of said plurality of second remote terminal devices directly accesses said channels, wherein collisions between inbound packets from different ones of said first and second remote terminal devices are prevented by allocating one of frequency, time slot, and frequency and time slot to said ones of said first and second remote terminal devices that generate the most inbound traffic, wherein when there are more active ones of said first and second remote terminal devices than there are channels, each of said first and second remote terminal devices is allocated a mini-slot, and wherein said first and second remote terminal devices comprise a multi-slot counter, said multi-slot counter in each of said first and second remote terminal devices being synchronized with said hub site and each of said first and second remote terminal devices.

5. A system for communicating with a large number of remote satellite locations comprising:

a plurality of a first set of remote terminal devices;

a plurality of second remote terminal devices operating in a dedicated mode using the same overlapping channels; and a hub site which determines threshold criteria for determining when said remote terminal devices are active, and allocates said channels, wherein when said one of said plurality of second remote terminal devices has been sufficiently active during a sliding window, said one of said plurality of second remote terminal devices directly accesses said channels, wherein collisions between inbound packets from different ones of said first and second remote terminal devices are prevented by allocating one of frequency, time slot, and frequency and time slot to said ones of said first and second remote terminal devices that generate the most inbound traffic, wherein when there are more active ones of said first and second remote terminal devices than there are channels, each of said first and second remote terminal devices is allocated a mini-slot, wherein said hub site calculates load for each of said first and second remote terminal devices and retains loads in memory, and wherein said load ($L_{new}$) for each of said first and second remote terminal devices is calculated according to the following formula:

$$L_{new} = L_{old}(1-\tau)^n + \tau,$$

where $\tau$ is a configurable constant, n is the number of time slots since the last time slot on which a packet was received from a remote terminal device, and $L_{old}$ is the previous load value of the remote terminal device.

6. A system for communicating with a large number of remote satellite locations comprising:

a plurality of a first set of remote terminal devices;

a plurality of second remote terminal devices operating in a dedicated mode using the same overlapping channels; and a hub site which determines threshold criteria for determining when said remote terminal devices are active, and allocates said channels, wherein when said one of said plurality of second remote terminal devices has been sufficiently active during a sliding window, said one of said plurality of second remote terminal devices directly accesses said channels, wherein collisions between inbound packets from different ones of said first and second remote terminal devices are prevented by allocating one of frequency, time slot, and frequency and time slot to said ones of said first and second remote terminal devices that generate the most inbound traffic, wherein when there are more active ones of said first and second remote terminal devices than there are channels, each of said first and second remote terminal devices is allocated a mini-slot, wherein said hub site calculates load for each of said first and second remote terminal devices and retains loads in memory, and wherein said load ($L_{new}$) each of said first and second remote terminal devices is calculated according to the following formula:

$$L_{new} = L_{old} * M * (1 - 1/N)^n + M/N$$

where M is a normalizing constant M, N is a time constant, which is the number of time slots in T seconds (where T is a configuration parameter), $\tau$ is 1/N, n is the number of time slots since the last time slot on which a packet was received from a remote terminal device, and $L_{old}$ is the previous load value of the remote terminal device.

7. A system for communicating with a large number of remote satellite locations as recited in claim 1, wherein said allocation table comprises information relating to a number of frequencies a remote terminal device is capable of utilizing, a number of mini-slots said remote terminal device may receive, a total number and identification of free inbound ones of said channels and mini-slots, a minimum and assigned maximum load value allocated to each of said first and second remote terminal device, current inbound resources allocated to each of said plurality of first and second remote terminal devices, whether said remote terminal device may become an active site, and whether said remote terminal device has any weighting factors associated with its load calculations.

8. A system for communicating with a large number of remote satellite locations as recited in claim 1, wherein said allocation table comprises a list of all remote sites from which a packet was received during a last measure increment.

9. A system for communicating with a large number of remote satellite locations as recited in claim 8, wherein said measure increment is one of a multi-slot time period and window.

10. A method for communicating with a large number of remote satellite locations, comprising the steps of:

simultaneously communicating in random access mode with a plurality of a first set of remote terminal devices and communicating with a plurality of second remote terminal devices in a dedicated mode using the same overlapping channels;

determining threshold criteria at a hub site to determine when said first and second set of remote terminal devices are active; and allocating said channels;

calculating load at said hub site for each of said first and second remote terminal devices and retaining loads in memory; and correlating said loads at said hub site for each of said first and second remote terminal devices with the last time slot in which a burst was last received from each of said first and second remote terminal devices; and maintaining said correlated loads in an allocation table.

11. A method for communicating with a large number of remote satellite locations as recited in claim 10, wherein said hub site transmits changes to said allocation table to said first and second remote terminal devices.

12. A method for communicating with a large number of remote satellite locations as recited in claim 10, wherein said hub site updates said allocation table every inbound frame.

13. A method for communicating with a large number of remote satellite locations as recited in claim 10, wherein said allocation table comprises information relating to a number of frequencies a remote terminal device is capable of utilizing, a number of mini-slots said remote terminal device may receive, a total number and identification of free inbound ones of said channels and mini-slots, a minimum and assigned maximum load value allocated to each of said first and second remote terminal device, current inbound resources allocated to each of said plurality of first and second remote terminal devices, whether said remote terminal device may become an active site, and whether said remote terminal device has any weighting factors associated with its load calculations.

14. A method for communicating with a large number of remote satellite locations as recited in claim 10, wherein said allocation table comprises a list of all remote sites from which a packet was received during a last measure increment.

15. A method for communicating with a large number of remote satellite locations as recited in claim 14, wherein said measure increment is one of a multi-slot time period and window.

16. A method for communicating with a large number of remote satellite locations, comprising the steps of:

simultaneously communicating in random access mode with a plurality of a first set of remote terminal devices and communicating with a plurality of second remote terminal devices in a dedicated mode using the same overlapping channels;

preventing collisions between inbound packets from different ones of said first and second remote terminal devices by allocating one of frequency, time slot, and frequency and time slot to said ones of said first and second remote terminal devices that generate the most inbound traffic;

allocating a mini-slot to each of said first and second remote terminal devices when there are more active ones of said first and second remote terminal devices than there are channels; and wherein said first and second remote terminal devices have a multi-slot counter, said multi-slot counter in each of said first and second remote terminal devices synchronizing with said hub site and each of said first and second remote terminal devices.

17. A method for communicating with a large number of remote satellite locations, comprising the steps of:

simultaneously communicating in random access mode with a plurality of a first set of remote terminal devices and communicating with a plurality of second remote terminal devices in a dedicated mode using the same overlapping channels;

determining threshold criteria at a hub site to determine when said first and second set of remote terminal devices are active; and allocating said channels;

calculating load at said hub site for each of said first and second remote terminal devices and retaining loads in memory, and wherein said load for each of said first and second remote terminal devices ($L_{new}$) is calculated according to the following formula:

$$L_{new} = (L_{old}(1 - \tau))^n + \tau$$

where $\tau$ is a configurable constant, n is the number of time slots since the last time slot on which a packet was received from a remote terminal device, and $L_{old}$ is the previous load value of the remote terminal device.

18. A method for communicating with a large number of remote satellite locations, comprising the steps of:

simultaneously communicating in random access mode with a plurality of a first set of remote terminal devices and communicating with a plurality of second remote terminal devices in a dedicated mode using the same overlapping channels;

determining threshold criteria at a hub site to determine when said first and second set of remote terminal devices are active; and allocating said channels;

calculating load at said hub site for each of said first and second remote terminal devices and retaining loads in memory, and wherein said load ($L_{new}$) for each of said first and second remote terminal devices is calculated according to the following formula:

$$L_{new} = L_{old} * M * (1 - 1/N)^n + M/N$$

where M is a normalizing constant M, N is a time constant, which is the number of time slots in T seconds (where T is a configuration parameter), and $\tau$ is 1/N, n is the number of time slots since the last time slot on which a packet was received from a remote terminal device, and $L_{old}$ is the previous load value of the remote terminal device.

* * * * *